US008630025B2

(12) United States Patent
Hayakawa et al.

(10) Patent No.: US 8,630,025 B2
(45) Date of Patent: Jan. 14, 2014

(54) IMAGE PROCESSING APPARATUS, IMAGE PROCESSING METHOD, AND IMAGE PROCESSING PROGRAM RECORDED RECORDING MEDIUM

(75) Inventors: Mizuki Hayakawa, Kawasaki (JP); Yuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 12/797,332

(22) Filed: Jun. 9, 2010

(65) Prior Publication Data

US 2010/0315689 A1 Dec. 16, 2010

(30) Foreign Application Priority Data

Jun. 15, 2009 (JP) ................................. 2009-142162

(51) Int. Cl.
*H04N 1/04* (2006.01)
(52) U.S. Cl.
USPC ........... 358/474; 358/449; 358/453; 382/286; 382/276
(58) Field of Classification Search
USPC ................. 358/449, 448, 453, 462, 474, 488; 382/286, 196, 276, 100
See application file for complete search history.

(56) References Cited

U.S. PATENT DOCUMENTS

| 5,430,550 | A * | 7/1995 | Hashimoto et al. ............ 358/488 |
| 6,433,896 | B1 * | 8/2002 | Ueda et al. ..................... 358/488 |
| 6,450,647 | B1 * | 9/2002 | Takeuchi ......................... 353/69 |
| 6,985,640 | B2 * | 1/2006 | Schweid ......................... 382/289 |
| 7,048,191 | B2 * | 5/2006 | Park et al. ................. 235/462.01 |
| 7,221,482 | B2 * | 5/2007 | Yamazaki et al. ............. 358/2.1 |
| 7,263,212 | B2 * | 8/2007 | Kawabe ......................... 382/124 |
| 7,376,285 | B2 * | 5/2008 | Song .............................. 382/289 |
| 7,417,579 | B1 * | 8/2008 | Woodell ...................... 342/26 B |
| 7,539,340 | B2 * | 5/2009 | Kochi et al. .................... 382/154 |
| 7,719,568 | B2 * | 5/2010 | Hung et al. .................... 348/159 |
| 8,180,176 | B2 * | 5/2012 | Kimura ......................... 382/296 |
| 8,213,742 | B2 | 7/2012 | Kondo |
| 8,243,154 | B2 * | 8/2012 | Doida ......................... 348/221.1 |
| 8,320,607 | B2 * | 11/2012 | Yamaguchi et al. .......... 382/100 |
| 8,379,254 | B2 * | 2/2013 | Fujioka ......................... 358/1.15 |
| 8,447,097 | B2 * | 5/2013 | Fujieda et al. ................ 382/154 |

FOREIGN PATENT DOCUMENTS

| JP | 2003-46731 | 2/2003 |
| JP | 2008-193608A A | 8/2008 |

* cited by examiner

*Primary Examiner* — Negussie Worku
(74) *Attorney, Agent, or Firm* — Canon USA Inc IP Division

(57) ABSTRACT

It is an object to provide an image processing apparatus which can properly obtain an original area even when there is one original or when there are a plurality of originals, an image processing method, and a recording medium in which an image processing program has been recorded. An image processing apparatus for deciding an image data area of an original from read image data obtained by being read by an image reading apparatus has: an extracting unit for extracting a plurality of image areas from the read image data; and a discriminating unit for discriminating whether or not tilt angles of the image areas extracted by the extracting unit are equal. If one or more tile angles of the image areas are not equal as a result of the discrimination by the discriminating unit, it is determined that each of the image areas is an image data area of the original on the assumption that there are a plurality of originals.

20 Claims, 15 Drawing Sheets

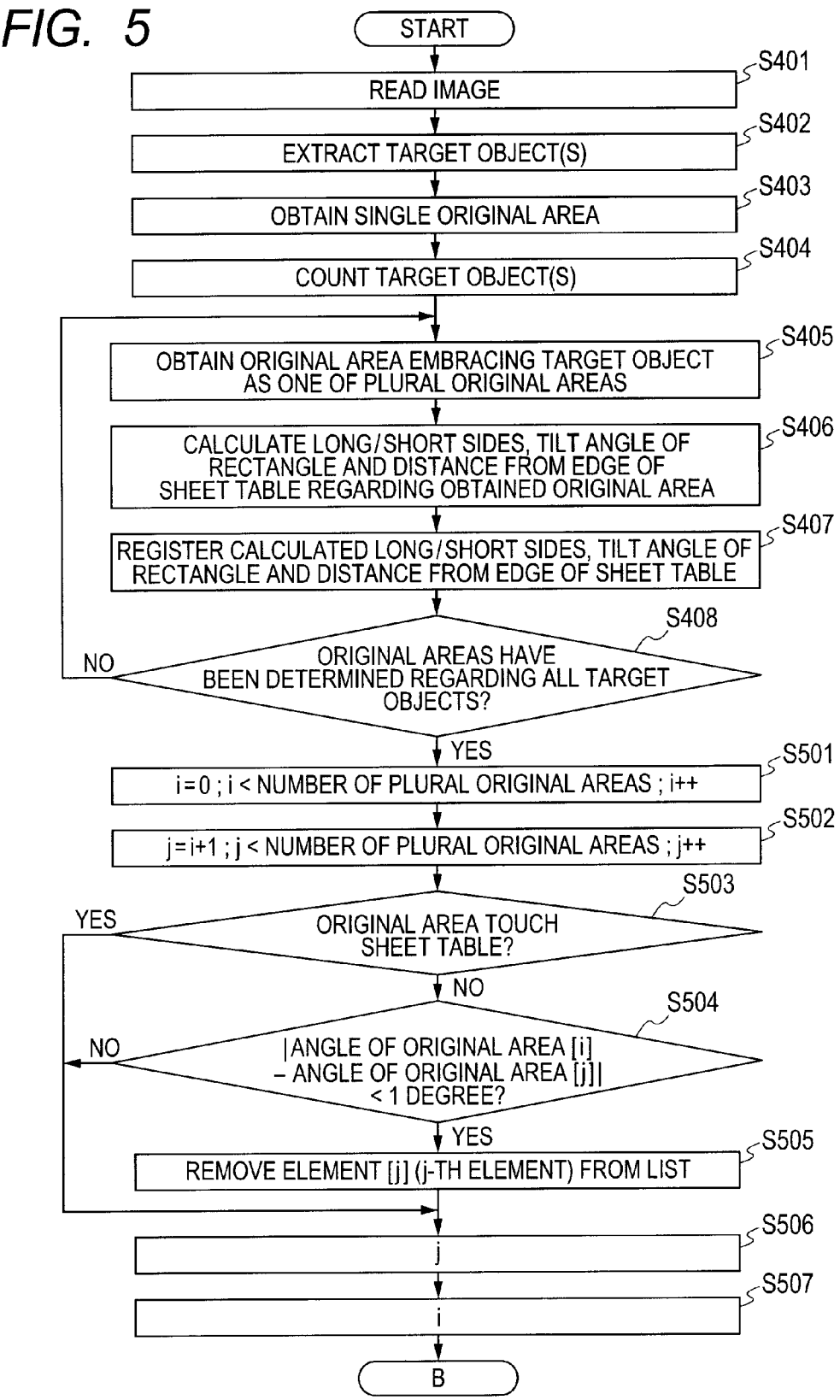

FIG. 10A

| INDEX NUMBER | LONG SIDE | SHORT SIDE | TILT ANGLE OF RECTANGLE | DISTANCE FROM EGDE OF SHEET TABLE |
|---|---|---|---|---|
| 1 | 127.1 mm | 89.1 mm | 0.1 DEGREES | 20.0 mm |
| 2 | 126.8 mm | 88.9 mm | 0.1 DEGREES | 30.0 mm |
| 3 | 127.1 mm | 89.0 mm | 0.1 DEGREES | 30.0 mm |
| 4 | 127.0 mm | 89.0 mm | 0.1 DEGREES | 20.0 mm |

FIG. 10B

| INDEX NUMBER | LONG SIDE | SHORT SIDE | TILT ANGLE OF RECTANGLE | DISTANCE FROM EGDE OF SHEET TABLE |
|---|---|---|---|---|
| 1 | 127.1 mm | 89.1 mm | 3.5 DEGREES | 15.0 mm |
| 2 | 126.8 mm | 88.9 mm | −1.6 DEGREES | 20.0 mm |
| 3 | 127.1 mm | 89.0 mm | 2.0 DEGREES | 23.5 mm |
| 4 | 127.0 mm | 89.0 mm | −5.1 DEGREES | 17.0 mm |

| INDEX NUMBER | TOP LEFT | BOTTOM LEFT | TOP RIGHT | BOTTOM RIGHT | DISTANCE FROM EGDE OF SHEET TABLE |
|---|---|---|---|---|---|
| 1 | (10, 10) | (10, 110) | (160, 10) | (160, 110) | 20.0 mm |
| 2 | (10, 130) | (10, 230) | (160, 130) | (160, 230) | 20.0 mm |

| INDEX NUMBER | TOP LEFT | BOTTOM LEFT | TOP RIGHT | BOTTOM RIGHT | DISTANCE FROM EGDE OF SHEET TABLE |
|---|---|---|---|---|---|
| 1 | (10, 10) | (10, 110) | (160, 10) | (160, 110) | 20.0 mm |
| 2 | (20, 130) | (20, 230) | (170, 130) | (170, 230) | 30.0 mm |

FIG. 18A
EXPRESSION REPRESENTATIVE OF LINE PASSING THROUGH TWO POINTS (x1, y1), (x2, y2)
$$(x2-x1)(y-y1) = (y2-y1)(x-x1)$$
FIG. 18B
EXPRESSION REPRESENTATIVE OF DISTANCE l FROM LINE
$(x2-x1)(y-y1) = (y2-y1)(x-x1)$
$$l = |(y1-y2)x3+(x2-x1)y3+x1y2-x2y1| / \sqrt{(y1-y2)^2+(x2-x1)^2}$$
FIG. 19A
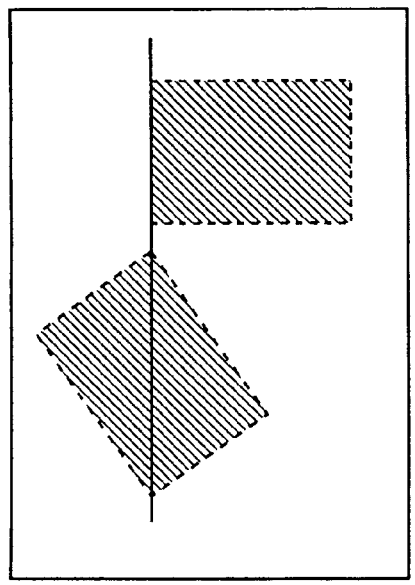
FIG. 19B
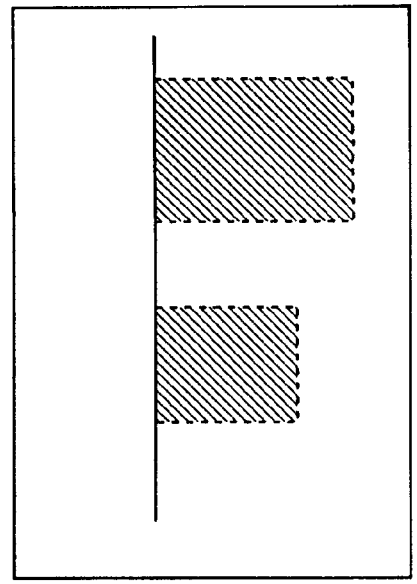

IMAGE PROCESSING APPARATUS, IMAGE PROCESSING METHOD, AND IMAGE PROCESSING PROGRAM RECORDED RECORDING MEDIUM

BACKGROUND OF THE INVENTION

1. Field of the Invention

The present invention relates to an image processing apparatus for reading an image of an original put on a sheet table (or original table) of an image reading apparatus and processing and outputting the read image. More particularly, the invention relates to an image processing apparatus for reading, in a lump, images of a plurality of originals put on a sheet table and outputting the image every original, an image processing method, and a recording medium in which an image processing program has been recorded.

2. Description of the Related Art

In recent years, image information is frequently handled in association with a development of a communication network, a realization of a high processing speed of a computer, and a realization of a large capacity of a storage medium. Particularly, such a request that image information fetched by a scanner or the like is intended to be read out more accurately and at a higher speed is increasing.

In the related arts, a method whereby a target object to be read is extracted from an original put on a sheet table and an original area of an original position, an original size, and the like is automatically determined has been known. A first method in the related art is a method of deciding the original area based on all of the extracted target objects. The first method in the related arts is a method which is effective when a fact that only a single original was put has previously been known.

A second method in the related art is a method of extracting each target object from a plurality of target objects and deciding an original area based on each of the extracted target objects. The second method has been disclosed in Japanese Patent Application Laid-Open No. 2003-46731. According to the second method, since the number of originals is not limited to one, the area of each original can be determined with respect to each target object.

According to the first method in the related art for deciding the original area from all of the target objects, since the process is executed on the assumption that there is one original, there is such a problem that if a plurality of originals were put on the sheet table, the proper original area cannot be decided.

According to the second method in the related art, since each target object is extracted from a plurality of target objects and the original area is decided based on each of the extracted target objects, the proper original area can be decided. However, if a photograph, an image object, or the like is arranged in the original, such a possibility that each image data is extracted as an independent target object (one original) remains. As an example in the case where the photograph, image object, or the like is arranged in the original, there is a case where the original is an index in which thumbnail images of photographs are printed as a list, a reference for presentation in which a plurality of rectangular areas are arranged, or the like.

As mentioned above, there is such a problem that if the method in the related art whereby each target object is extracted from a plurality of target objects and the original area is decided by using the extracted target objects is used, the correct original area cannot be decided.

To solve the problem occurring in the case of deciding the original area, a method of allowing the user to select a proper one of the first and second methods in the related art for the original put on the sheet table by the user himself is considered. There is, however, a case where the beginner user or the like cannot discriminate which one of the processes is proper for the original put on the sheet table by himself.

Further, there is such a problem that since the operation "the user selects the proper process for the original put on the sheet table by himself" is added, the operation becomes complicated. Such a problem becomes an obstacle when realizing such a function that the user puts the original onto the sheet table and merely by pressing a "Read button", an image of a proper reading area can be obtained according to the original.

SUMMARY OF THE INVENTION

Accordingly, the present invention is conceived as a response to the above-described disadvantages of the conventional art.

According to one aspect of the present invention, preferably, there is provided an image processing apparatus for deciding an image data area of an original from read image data obtained by being read by an image reading apparatus, comprising: an extracting unit configured to extract a plurality of image areas from the read image data; a discriminating unit configured to discriminate whether or not tilt angles of the image areas extracted by the extracting unit are equal; and a deciding unit configured to decide that each of the image areas is an image data area of the original on the assumption that there are a plurality of originals if it is determined as a result of the discrimination by the discriminating unit that one or more tilt angles of the image areas are not equal.

According to another aspect of the present invention, preferably, there is provided an image processing apparatus for deciding an image data area of an original from read image data obtained by being read by an image reading apparatus, comprising: an original area extracting unit configured to extract one image area on the assumption that there is one original; a plural original area extracting unit configured to extract a plurality of image areas on the assumption that there are a plurality of originals; a discriminating unit configured to discriminate whether or not positions of the image areas extracted by the plural original area extracting unit are aligned; and a deciding unit configured to decide that each of the plurality of image areas extracted by the plural original area extracting unit is an image data area of the original if it is determined as a result of the discrimination by the discriminating unit that the positions of the image areas are not aligned and to decide that the image area extracted by the original area extracting unit is the image data area of the original if it is determined as a result of the discrimination by the discriminating unit that the positions of the image areas are aligned.

According to the invention, when the user puts a plurality of L-size photographs or the like onto the sheet table, since putting angles of the photographs are different and sizes of the original areas are equal, a plurality of areas can be decided as L-size photographs. Even if it is determined like a printed matter or the like of which the inside includes photograph(s), in the case of the photographs being the general printed matters, since the angles of the photographs are equal and area sizes are different in many cases, the original area can be decided as a large single area as a printed matter instead of the photographs.

According to the invention, therefore, there is such an advantage that even when there is one original or there are a plurality of originals, the proper image data of the original can be obtained.

Further features of the present invention will become apparent from the following description of exemplary embodiments with reference to the attached drawings.

BRIEF DESCRIPTION OF THE DRAWINGS

FIG. 5 is a flowchart illustrating the reading operation of the scanner 10.

FIGS. 10A and 10B are diagrams illustrating lists of calculation values obtained from a plurality of areas of the print original.

FIGS. 18A and 18B are diagrams of an expression for obtaining a straight line passing through two points and an expression for obtaining a distance between a point and the straight line.

FIGS. 19A and 19B are diagrams illustrating extraction results of a plurality of areas whose directions and sizes are respectively different.

DESCRIPTION OF THE EMBODIMENTS

Preferred embodiments of the present invention will now be described in detail in accordance with the accompanying drawings.

Embodiment 1

Figure 1:
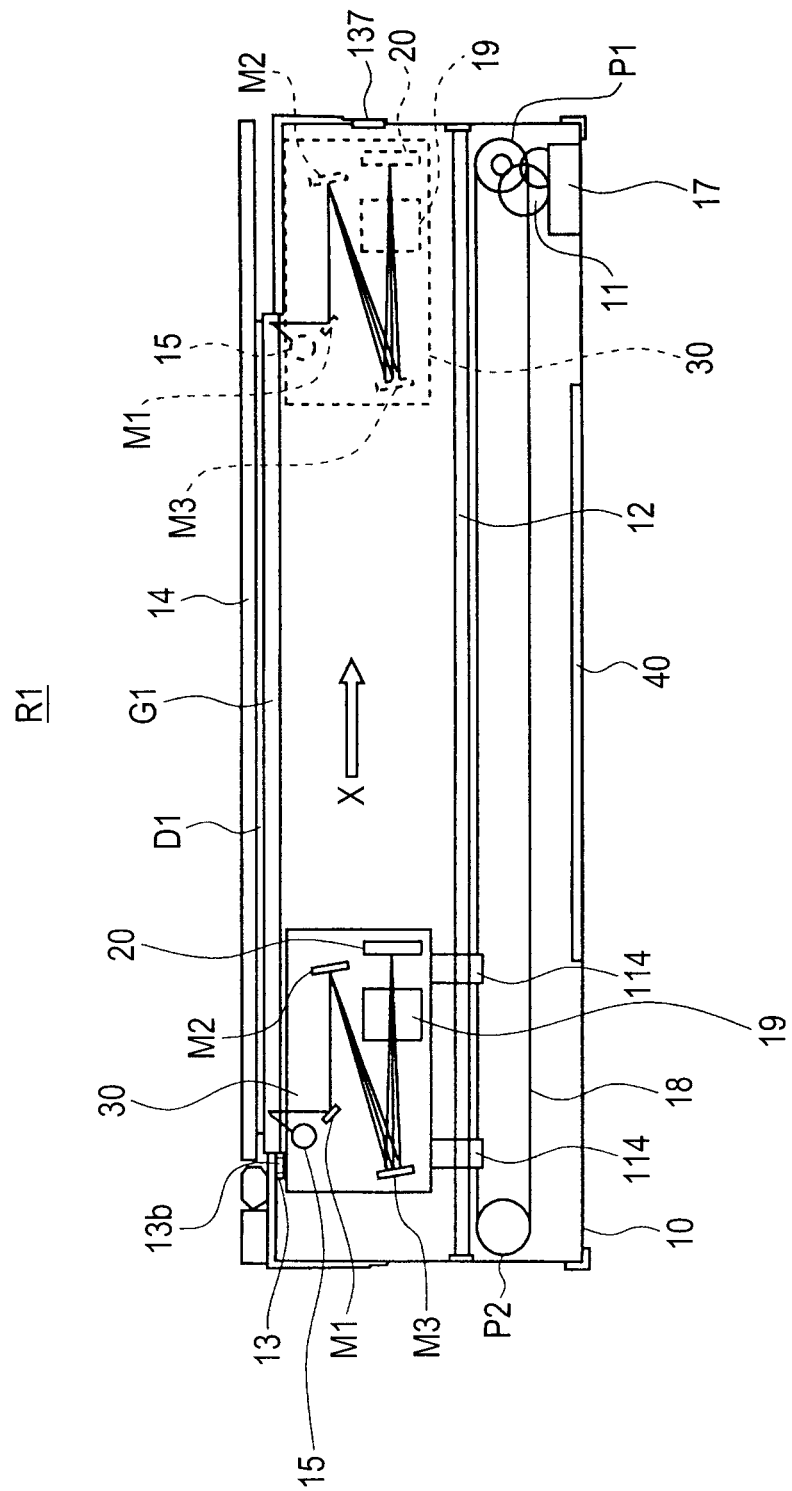
FIG. 1 is a cross sectional view illustrating an image reading apparatus R1 according to an embodiment 1 of the invention.

FIG. 1 is a cross sectional view illustrating an image reading apparatus R1 according to an embodiment 1 of the invention.

The image reading apparatus R1 has a scanner 10 on which a reading original D1 is put. The scanner 10 is connected to a host computer (hereinbelow, referred to as a "host PC") by an interface cable (not shown).

The image reading apparatus R1 has pulleys P1 and P2, sheet table glass G1, a gear train 11, a guide rail 12, a white reference plate 13, a pressing plate 14, a pulse motor 17, an endless belt 18, an optical unit 30, and an electric board 40.

A black mark 13b is provided in the white reference plate 13. The scanner 10 determines a reading area by using the black mark 13b as a reference and reads an image.

The optical unit 30 and the pulse motor 17 are electrically connected by cables (not shown). The optical unit 30 is mounted on the pressing plate 14 and is slidable along the guide rail 12. The pressing plate 14 is fixed to the endless belt 18.

The optical unit 30 is constructed by a light source 15 for a reflective original, a plurality of reflecting mirrors M1, M2, and M3, an imaging lens 19, and a line sensor 20 serving as an image pickup unit.

Subsequently, the reading operation of a reflective original image in the scanner 10 will be described. When the host PC generates a read command, the scanner 10 starts the reading operation. The scanner 10 turns on the light source 15 for the reflective original of the optical unit 30. Reflection light from the reading original D1 is reflected by the plurality of reflecting mirrors M1, M2, and M3 and formed as an image onto the line sensor 20 through the imaging lens 19, so that an image of one line in a main scan direction is read.

The pulley P1 is rotated by a motive power of the pulse motor 17 through the gear train 11, thereby driving the endless belt 18. Thus, the optical unit 30 fixed to the pressing plate 14 is moved on the guide rail in the sub-scan direction shown by an arrow X.

While moving the optical unit 30 in the sub-scan direction, the scanner 10 repeats the reading of a line image in the main scan direction. While executing the reading operation to a position shown by a broken line in FIG. 1, the scanner 10 moves the optical unit 30 and scans the whole surface of the sheet table glass G1.

However, a partial image of the original on the sheet table glass G1 can be read according to the contents of the read command from the host PC. In this case, as for the reading image area which is designated by the host PC, in the main scan direction, the control unit on the electric board 40 specifies a pixel area which is used in a sensor output, thereby enabling a partial image of the reading original D1 on the sheet table glass G1 to be read. In the sub-scan direction, the control unit on the electric board 40 specifies a moving area of the optical unit 30, thereby enabling the partial image of the reading original D1 on the sheet table glass G1 to be read.

In the case of moving the optical unit 30 in the sub-scan direction, a system controller 41 selects a speed according to an image reading resolution setting which is designated by the host PC and reads the image.

The scanner 10 has a multicrop scanning function which can individually read a plurality of originals on the sheet table and automatically and sequentially reads a plurality of reading originals D1 put on the sheet table glass G1 under control of the host PC or the scanner 10 itself.

An operation panel is arranged on the pressing plate 14. A liquid crystal display screen and buttons are provided for the operation panel. The user inputs parameters of the multicrop to the scanner 10 and executes the reading start operation or the like.

Figure 2:
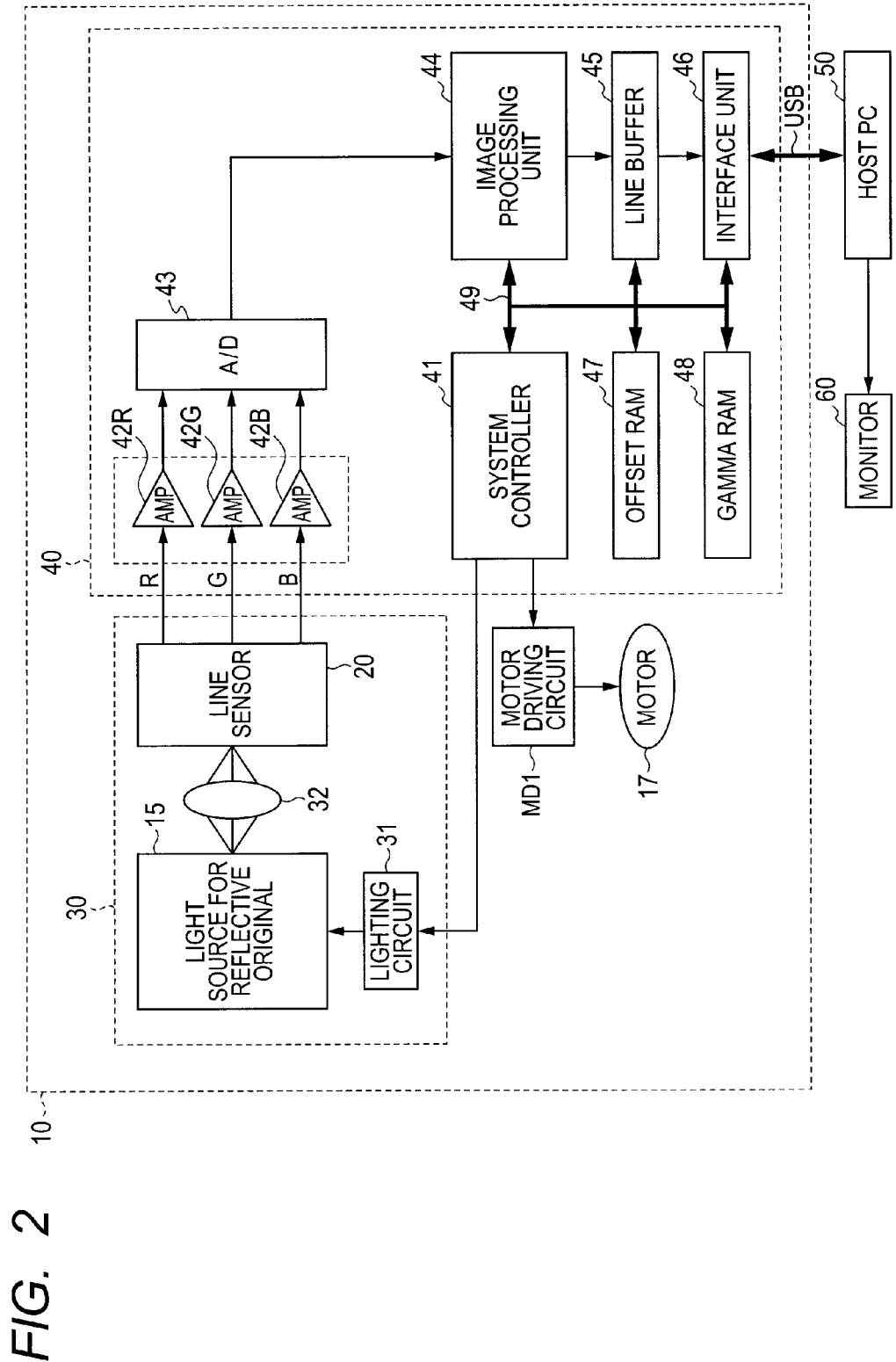
FIG. 2 is a block diagram illustrating a functional construction of a scanner 10 in the embodiment 1.

FIG. 2 is a block diagram illustrating a functional construction of the scanner 10 in the embodiment 1.

The scanner 10 has the optical unit 30, electric board 40, pulse motor 17, a light source for a translucent original, and a motor driving circuit MD1.

The optical unit 30 has a light source lighting circuit 31. The light source lighting circuit 31 is a circuit for turning on the light source 15 for the reflective original. A detecting unit for detecting a light amount of the light source 15 for the reflective original is provided in the circuit. If a cold cathode tube is used as a light source 15 for the reflective original, what is called an inverter circuit is constructed.

The electric board 40 has the system controller 41, analog gain controllers 42R, 42G, and 42B, an A/D converter 43, an image processing unit 44, a line buffer 45, and an interface unit (I/F unit) 46. The electric board 40 also has an offset RAM 47, a gamma RAM 48, and a CPU bus 49.

The analog gain controllers 42R, 42G, and 42B variably amplify analog image signals output from the line sensor 20. The A/D converter 43 converts the analog image signals output from the analog gain controllers 42R, 42G, and 42B into a digital image signal. The image processing unit 44 executes image processes such as offset correction, shading correction, digital gain control, color balance control, masking, resolution conversion in the main scan direction and in the sub-scan direction, image compression, and the like to the digital image signal.

The line buffer 45 temporarily stores the image data and has a general-use RAM (random access memory). The I/F unit 46 communicates with a host PC 50 and is constructed by a USB interface. Another interface such as IEEE1394 may be used as an I/F unit 46.

The offset RAM 47 is a RAM which is used as a working area when executing an image process. Since line sensors for RGB have predetermined offsets and are arranged in parallel in the line sensor 20, the offset RAM 47 is used to correct offsets among the RGB lines. The offset RAM 47 is also used to execute the shading correction and the like and to temporarily store various kinds of data. The offset RAM 47 is realized here by a general-use random access memory. The gamma RAM 48 is a RAM for storing a gamma curve and performing the gamma correction.

The system controller 41 is a system controller in which a sequence for the whole film scanner has been stored and makes various kinds of control in response to commands from the host PC 50.

The CPU bus 49 is a bus for connecting the system controller 41, image processing unit 44, line buffer 45, I/F unit 46, offset RAM 47, and gamma RAM 48 and has an address bus and a data bus.

The motor driving circuit MD1 is a motor driving circuit for the pulse motor 17 and outputs an excitation switching signal of the pulse motor 17 by a signal from system controller 41 serving as a system control unit.

Subsequently, in the embodiment 1, a schematic construction of the host PC 50 which is used to control the scanner 10 will be described.

Figure 3:
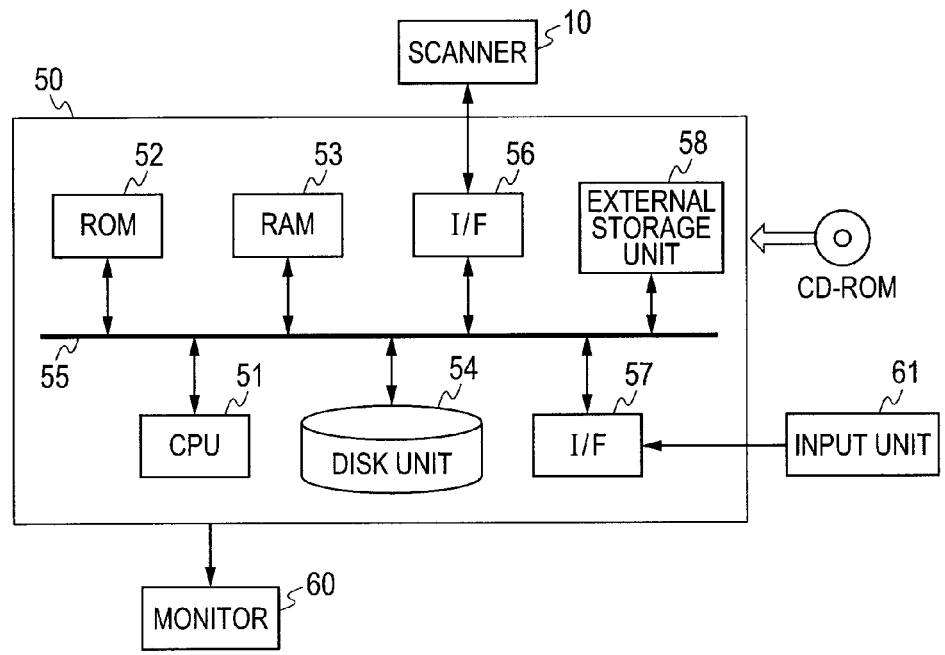
FIG. 3 is a diagram illustrating a schematic construction of a host PC 50 in the embodiment 1.

FIG. 3 is a diagram illustrating the schematic construction of the host PC 50 which is used to control the scanner 10 in the embodiment 1.

The host PC 50 has a central processing unit (CPU) 51, a ROM 52, a RAM 53, a disk unit 54, a bus 55, interfaces (I/F) 56 and 57, and an external storage unit 58.

A program for realizing the operation of a flowchart illustrated in FIG. 5 has been held in the ROM 52. The RAM 53 provides a storage area and a work area which are necessary for the operation of the program.

The CPU 51 executes processes according to the program held in the ROM 52.

The bus 55 connects each of the above component elements and enables data to be transmitted and received among the above component elements. The I/F 56 is an interface for communicating with the scanner 10 and is realized by a USB interface in a manner similar to the I/F unit 46 of the scanner 10. However, another interface such as IEEE1394 may be used.

The I/F 57 is connected to an input unit 61 such as mouse or keyboard. The external storage unit 58 is a device for driving an external storage medium such as floppy (registered trademark) disk or CD-ROM. As mentioned above, in place of previously holding the control program into the ROM 52, if the control program has been stored in the external storage medium, the I/F 57 reads out the control program and downloads it. The control program may be downloaded via a network through a network connector (not shown).

Figure 4:
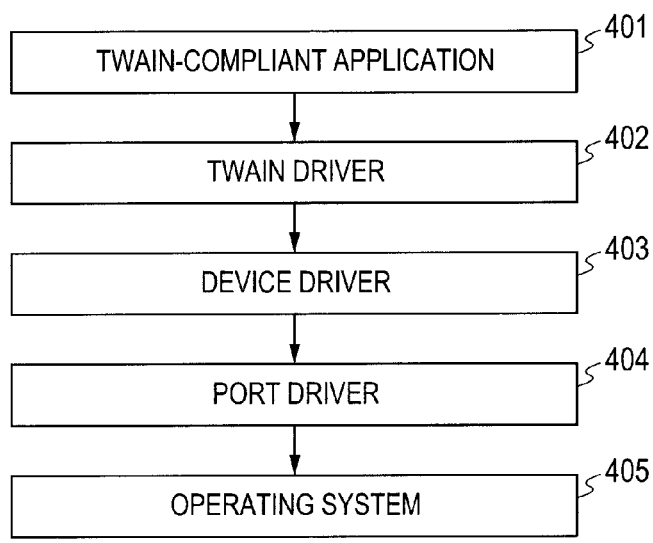
FIG. 4 is a constructional diagram of software which operates in the host PC 50 in the embodiment 1.

FIG. 4 is a diagram illustrating a construction of software which operates in the host PC 50 illustrated in FIG. 3 in the embodiment 1.

A TWAIN-compliant application (application corresponding to the TWAIN standard) 401 reads out the image from the scanner 10 illustrated in FIG. 3 via a TWAIN driver 402 and displays onto a monitor 60 illustrated in FIG. 3.

The TWAIN-compliant application 401 also has a function for processing and holding the image by an instruction from the user.

The TWAIN driver 402 transfers the image from the scanner 10 illustrated in FIG. 3 to the TWAIN-compliant application 401 and displays a unique GUI (Graphical User Interface), according to the TWAIN standard.

The GUI has a function for performing a designation of a crop area for a preview image, a setting of a resolution, a setting of a reading mode (binary, 8-bit multivalue, 24-bit multivalue, etc.), a setting of a color adjustment such as a gamma correction, and the like.

A device driver 403 accesses the image processing unit 44 illustrated in FIG. 2 through the I/F unit 46 illustrated in FIG. 2. The device driver 403 makes shading control, sets a motor speed according to the resolution and crop range, transmits the gamma correction data received from the TWAIN driver 402 to the gamma RAM 48 illustrated in FIG. 2, and makes flow control for fetching the image.

A port driver 404 makes communication control with the scanner 10 illustrated in FIG. 2 according to an interface such as parallel interface, SCSI interface, USB interface, or IEEE1394 interface.

An operating system 405 is an operating system (OS) of the host PC 50 illustrated in FIG. 3 such as "Windows (registered trademark)".

Subsequently, the reading operation of the scanner 10 by the host PC 50 in the embodiment 1 will be described.

FIG. 5 is a part of a flowchart illustrating the reading operation of the scanner 10 by the host PC 50 in the embodiment 1.

In step S401, the scanner reads an image of the original on the sheet table, thereby obtaining image data. A resolution of the image upon reading may be either a temporary resolution or a desired resolution of the user.

Figure 7A:
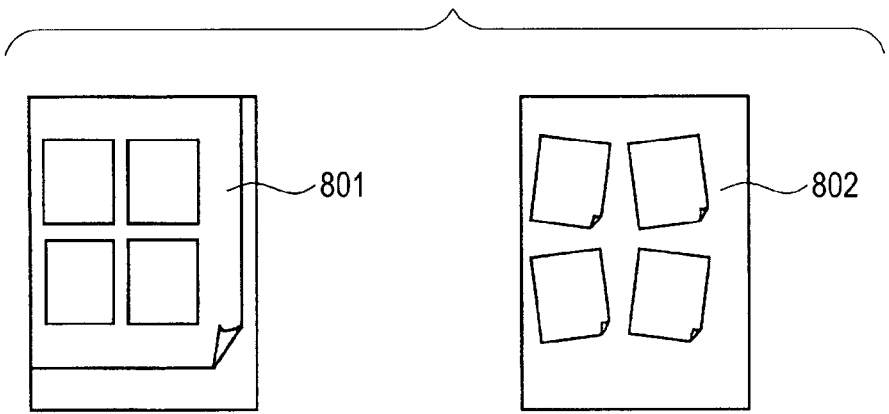
FIGS. 7A, 7B and 7C are diagrams illustrating an image of one print original and an image of four photograph originals.

FIG. 7A is a diagram illustrating an image 801 of one print original obtained in S401 and an image 802 of four photograph originals. A target object (or target objects) to be read is (are) extracted from the image in S402.

Figure 7B:
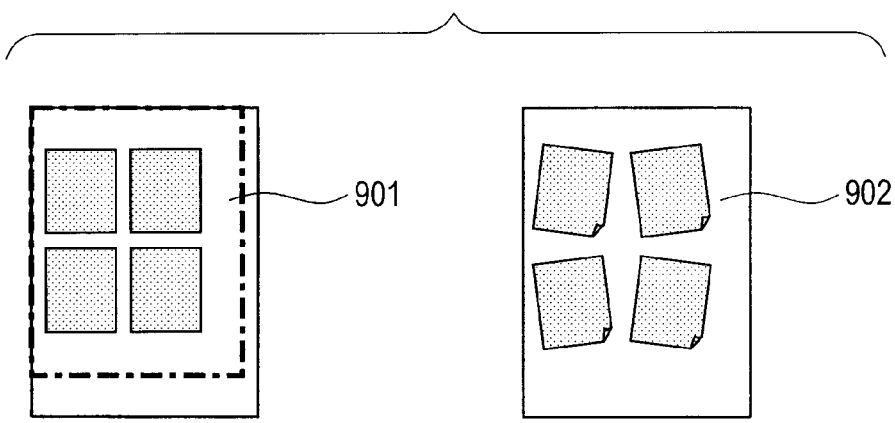

FIG. 7B is a diagram illustrating results of the extraction. The result extracted from the image 801 of the one print original in FIG. 7A is an extraction result 901 of one print original. The result extracted from the image 802 of the four photograph originals is an extraction result 902 of four photograph originals. Ax extracting method will be described in detail hereinafter.

In S403, an original area is obtained with respect to all of the extracted target objects by using an original area deciding unit for deciding the original area in the case where there is one reading original.

Figure 7C:
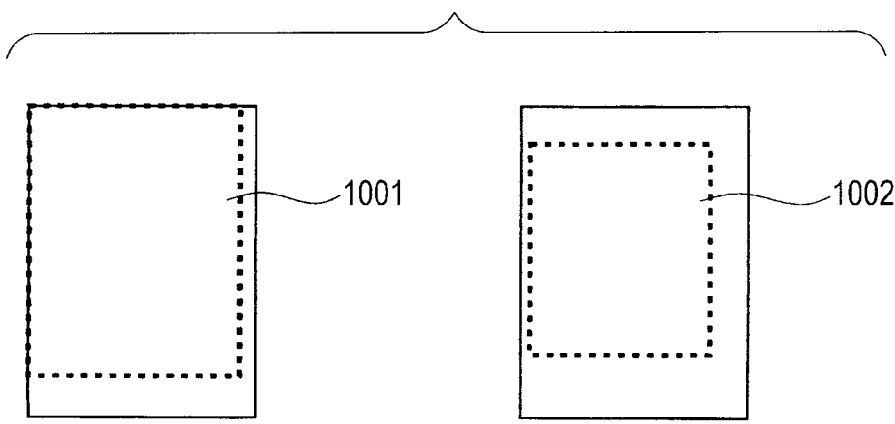

FIG. 7C is a diagram illustrating the obtained one area. The single original area obtained from the extraction result 901 of the one print original in FIG. 7B is an area 1001. The single original area obtained from the extraction result 902 of the four photograph originals in FIG. 7B is an area 1002. An extracting method will be described in detail hereinafter.

In S404, the number of extracted target objects is counted. The extraction results obtained in S402 may be used as extracted target objects. The extraction results may be obtained by changing the setting for the extraction by using the extracting method used in S402.

There is a labeling or the like in the case of counting the number of target objects. First, a count value of a counter is initialized to 0, the image is scanned, and a pixel as a target object is searched for. If the count value is not set to the pixel serving as a target object, the present count value of the counter is set to the pixel.

The same count value is also set to a pixel serving as an adjacent target object. The same count value is also set to a pixel adjacent to the pixel in which the count value has newly been set. At a point of time when the number of pixels in which the count value is not set among the pixels as adjacent target objects reaches 0, the count value is increased. After that, the image is scanned and the target object is searched for. The count value at a point of time when the searching operation is finished indicates the number of extracted target objects.

In S405, as for one target object, such an original area as to include the target object is obtained by using an original area deciding unit in the case where there are a plurality of originals. For example, there is a method similar to that in S403. By presuming a case where a photograph has been set in an inclined state, the original area is inclined and the original area can be decided.

If it is determined that the decided original area does not satisfy the correct conditions, such an area may be excluded from the target objects in the deciding process of the original areas. For example, a case where an aspect ratio of a rectangle is equal to or less than a predetermined value, a case where the rectangles are not come into contact with each other, and the like can become the correct conditions.

Figure 8A:
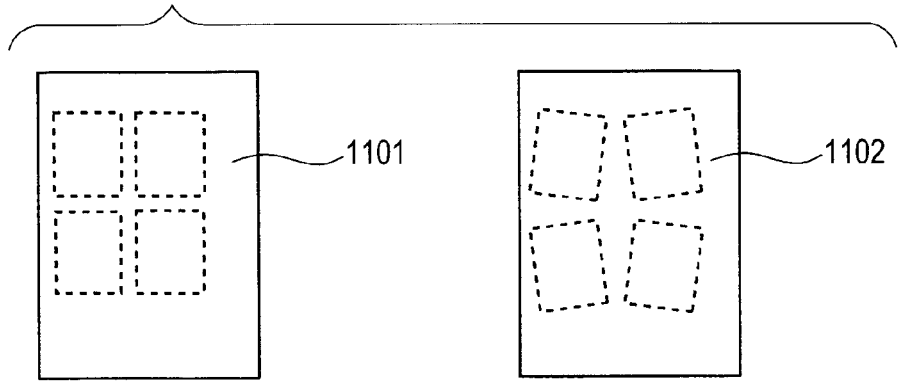
FIG. 8A is a diagram illustrating plural original areas of one print original and plural original areas of four print originals.

FIG. 8A is a diagram illustrating obtained results. Plural original areas obtained from the extraction result 901 of the one print original in FIG. 7B are areas 1101. Plural original areas obtained from the extraction result 902 of the four photograph originals in FIG. 7B are areas 1102.

The single original area 1001 of the one print original in FIG. 7C and the plural original areas 1101 of the one print original in FIG. 8A are different. In the extraction result 901 illustrated in FIG. 7B, although a lower side and a right side of the original have been extracted, they are not reflected to the plural original areas 1101. This is because since the area is out of the correct conditions concerned with the aspect ratio of the rectangle, the touching of the rectangles, and the like, this area was excluded from the plural original areas 1101.

Figure 8B:
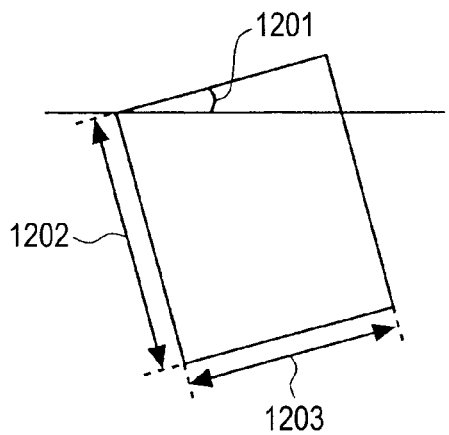
FIG. 8B is a diagram illustrating long and short sides and angle of the original.

A long side 1202 of an original illustrated in FIG. 8B, a short side 1203 of the original, and an angle 1201 of the original are obtained in S406 from the obtained plural original areas. Since each of the plural original areas is a rectangle, the long side and the short side are obtained. The tilt angle of the original is obtained so as to lie within a range from −45° to 45°.

Figure 9:
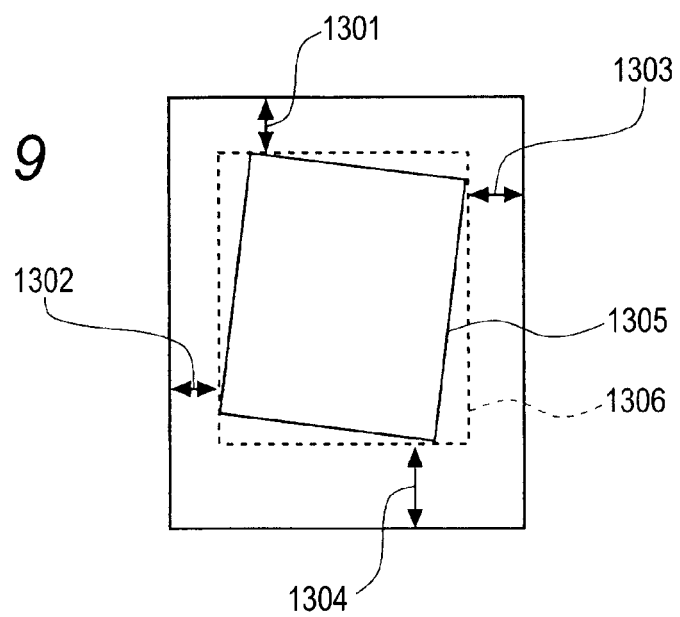
FIG. 9 is a diagram illustrating positions of an area and a sheet table and distances from edges of the sheet table.

Further, a distance between an original area illustrated in FIG. 9 and each edge from the original is obtained. First, as for an original area 1305, an original inclusion rectangle 1306 which includes the area is obtained. Thus, a maximum value and a minimum value of each vertex of the original area can be obtained. After that, a distance between an upper side of the original inclusion rectangle and an upper side of the sheet table (distance (Top) 1301 from the edge of the sheet table) is obtained. Each distance is also similarly obtained with respect to other three sides. A distance (Left) 1302 from the edge of the sheet table, a distance (Right) 1303 from the edge of the sheet table, and a distance (Bottom) 1304 from the edge of the sheet table are obtained, respectively. After that, a minimum value among the obtained four distances is set to a distance from the edge of the sheet table.

Obtained calculation results are registered in a list in S407. A list obtained after all of the calculation results obtained from the plural original areas 1101 of the one print original in FIG. 8A were registered is illustrated in FIG. 10A. Since there are four areas, index numbers are equal to 1 to 4. The long side, the short side, the tilt angle of the rectangle, and the distances from the edges of the original have been recorded in each index number. In the list, each element can be referred to by the index number and only a specific index number can be deleted.

FIG. 10B is a diagram illustrating a list obtained after all of the calculation results obtained from the plural original areas 1102 of the four photograph originals in FIG. 8A were registered.

In S408, a processing loop of S405 to S407 is repeated until all of the target objects are processed. If YES in S408, all of the target objects have been processed and the calculation results have been registered in the list.

In S501, the processing loop is repeated the number of times as many as the number of plural original areas obtained in S405 from the beginning to the end thereof. A termination of the loop is step S507.

In S502, the processing routine is looped from (the count value of a loop count in S501)+1 to the end of the plural original areas obtained in S405. A termination of the loop is step S506.

By the loop process of S501 and S502, all combinations of the plural original areas can be operated. For example, assuming that there are four plural original areas 0, 1, 2, and 3, i=0 at the start of the loop in S501 and j=1, 2, 3 in the loop of S502.

When i=0, j=2, 3. When i=2, j=3. Finally, when i=3, since j≥4, the loop process does not occur. By the above two loop processes, all combinations of (0, 1), (0, 2), (0, 3), (1, 2), (1, 3), and (2, 3) are incorporated.

In S503, whether or not the original area touches the sheet table is discriminated. The distances from the edge of the sheet table are referred to from the lists (FIGS. 10A and 10B) based on the values of i and j and whether or not the distance value is equal to or less than 5.0 mm is discriminated. If the original area touches the edge of the sheet table, the distance from the edge of the sheet table is equal to 0.0 mm. However, it is set to 5.0 mm in consideration of a calculation error or the like. However, a case where the distance is smaller or larger than 5.0 mm is also considered due to a precision of the device or the like.

If it is now determined that the original area touches the sheet table, the processing routine advances to S506. In other cases, the processing routine advances to S504.

In S504, a difference between angles of two original areas is obtained. The tilt angles of the rectangles are referred to from the lists (FIGS. 10A and 10B) based on the values of i and j and an absolute value of the difference between the two values is obtained.

If the absolute value is equal to or less than 1.0 degree, S505 follows. In other cases, S506 follows. When the user has manually put a photograph original or the like onto the sheet table, even if he accurately put it, a small angle difference occurs. In the case of an original on which photographs have been printed, since the photographs have accurately been arranged, an angle difference does not occur. In the case of the original on which photographs or the like have been printed, the angle difference is equal to almost 0 degree although it depends on precision at the time of obtaining the angle in S405.

Although the angle difference is set to 1 degree in consideration of a margin such as an error, a case where it is larger or smaller than 1 degree is also considered in dependence on the precision in S405.

In S505, the j-th element is excluded from the list. S506 is a termination of the loop of S502. S507 is a termination of the loop of S501.

Figure 6A:
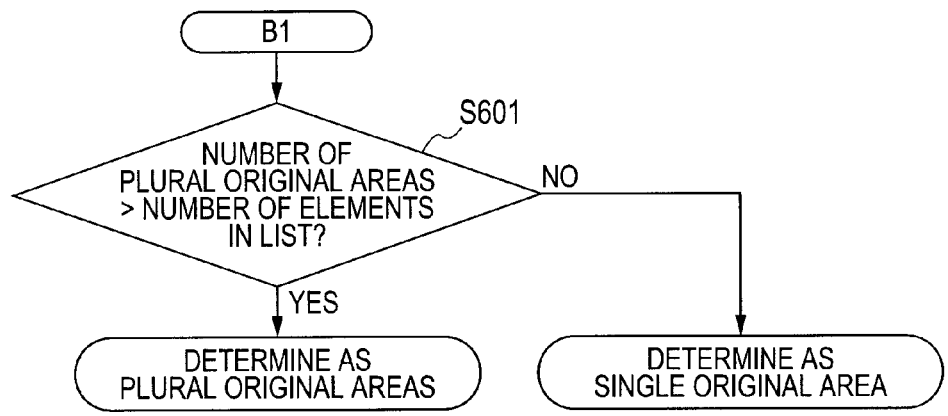
FIGS. 6A and 6B are flowcharts illustrating the reading operation of the scanner 10.
Figure 6B:
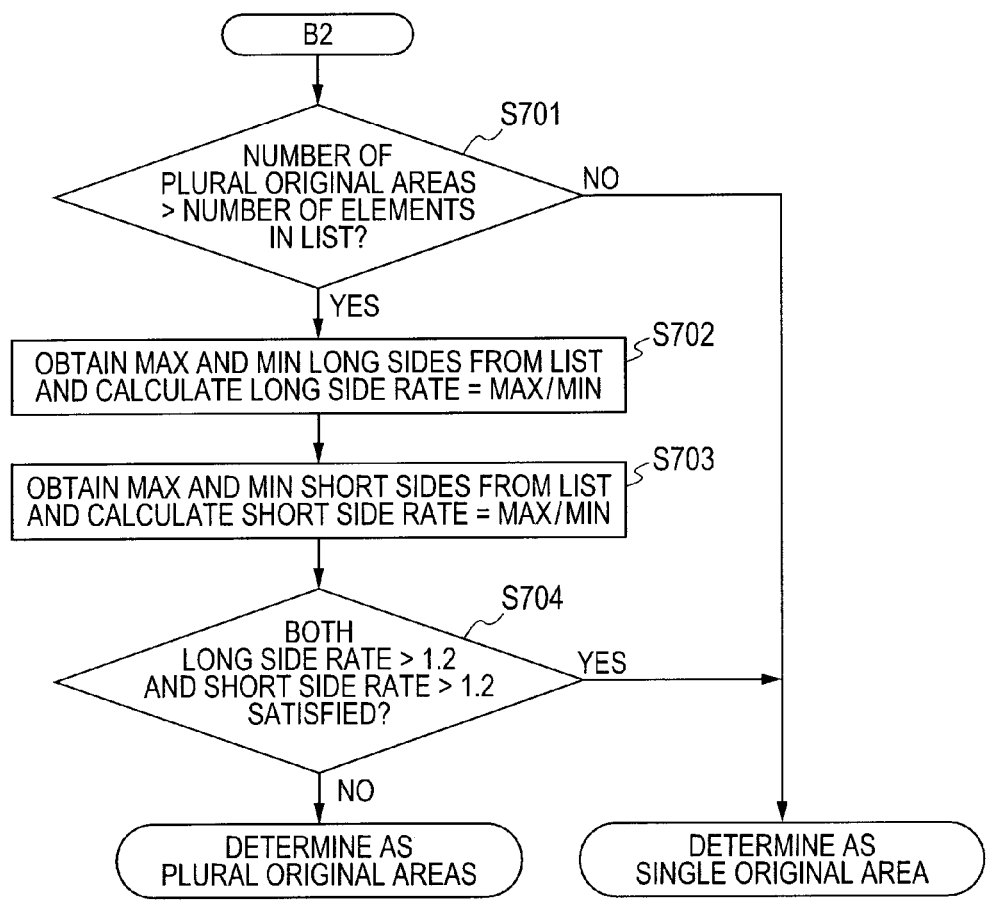

FIGS. 6A and 6B are parts of flowcharts illustrating the reading operation of the scanner 10 by the host PC 50 in the embodiment 1.

In S601, the number of plural original areas obtained in S405 in FIG. 5 is compared with the number of elements in the list operated in S407 and S505 in FIG. 5. If the removal of the elements in S505 in FIG. 5 is not performed, the number of plural original areas and the number of elements in the list coincide. This state corresponds to a case where each angle difference of the plural original areas does not occur and the user does not manually put a plurality of originals. Therefore, the single original area obtained in S403 in FIG. 5 is set to an original area of the image read in S401.

When at least one element has been removed in S505 in FIG. 5, the number of plural original areas is larger than the number of elements in the list. This state corresponds to a case where one angle difference of the plural original areas has occurred and the user has manually put a plurality of originals. Therefore, the plural original areas obtained in S405 in FIG. 5 are set to the original areas of the image read in S401.

Although not shown in particular, the image process can be executed, after that, based on the decided original area. If the resolution of the image read in S401 is a temporary resolution, the decided original area can be also read at a desired resolution. If a skew occurred in the obtained original area, the image can be also rotated so as to correct the skew.

Figure 11:
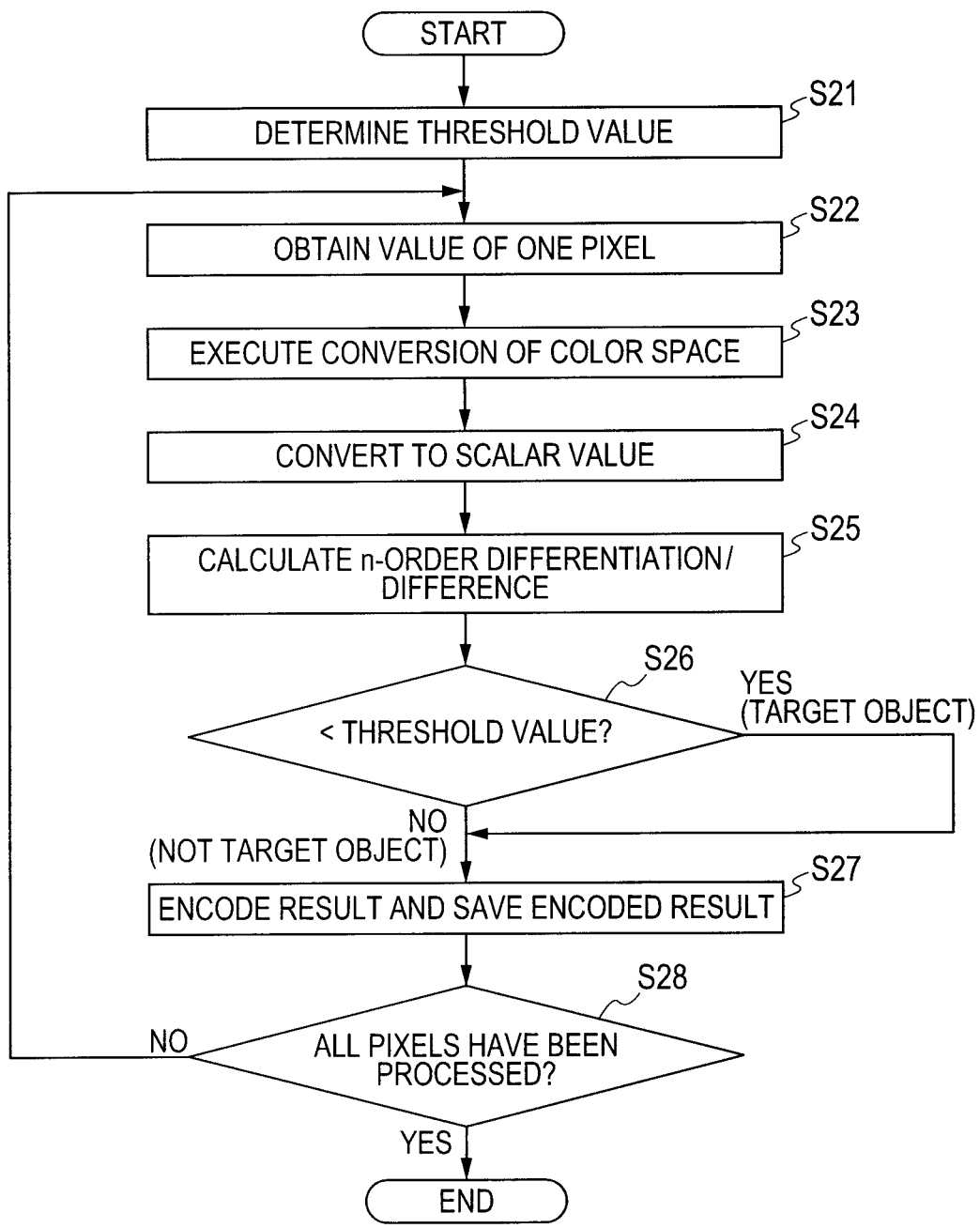
FIG. 11 is a flowchart illustrating the operation for extracting a target object to be read.

FIG. 11 is a flowchart illustrating the operation for extracting a target object to be read in the embodiment 1. It corresponds to the process of S402 in the flowchart in FIG. 5.

In S21, a threshold value for binarization is determined from the image. An optimum value of the threshold value varies depending on a comparing method of S26, which will be described hereinafter. To easily decide the threshold value, it is sufficient to preliminarily determine a fixed value.

In S22, a value of a certain one pixel is obtained. Although the process has to be executed to all pixels in order to extract the target object to be read from the image, the process can be executed every pixel in S22. Ordinarily, the position of a certain one pixel is decided by using an X coordinate and a Y coordinate. When starting the process, the X coordinate and Y coordinate are initialized to an initial value (generally, 0), the X coordinate and Y coordinate are changed each time one pixel is processed, and all pixels are scanned.

In S23, a color space of the pixel values obtained in S22 is converted. Generally, the color space of every scanner 10 differs depending on characteristics of the line sensor 20, a color filter, and the light source 15 for the reflective original. If a device independent color space is used, since there is a possibility that the target object can be extracted irrespective of the scanner 10, the color space is converted in S23. In the case where parameters dependent on the scanner 10 are adjusted and the threshold value in the process of S21 is determined, the process of S23 can be omitted.

In S24, the value obtained in S23 is converted into a scalar value. In the case of inputting a color image, the image has three color values of RGB. In order to compare the RGB three color values (vector values) with the threshold value (scalar value), the RGB three color values are converted into scalar values. In the case of converting the RGB three color values into the scalar values, there is a method of fetching any one of the three colors, a method of obtaining a weight average that is proper to the RGB three color values and obtaining a luminance value, a method of calculating a saturation from the RGB three color values, or the like.

However, in the case where the input image is an image of one color such as a gray scale, since such a process is unnecessary, the process of S24 can be omitted.

In S25, an n-order differentiation or a difference is calculated from the values obtained in S24. In the process for extracting the target object from the image, there is a possibility that by extracting the reading original D1 put on the sheet table and other boundaries, the subsequent original area can be precisely and easily decided. An n-order differentiation or a difference is calculated in order to extract a boundary of the reading original D1 put on the sheet table. Since such a process depends on the characteristics of the values obtained in S24, the process of S25 can be omitted if it is unnecessary.

In S26, the value obtained in S25 and the threshold value decided in S21 are compared. If it is less than the threshold value, it is determined that the object is not the target object. If it is equal to or larger than the threshold value, it is determined that the object is the target object. Such a relation is reversed depending on the values obtained in S23 to S25. There is also a case where if the value is less than the threshold value, it is determined that the object is the target object, and if it is equal to or larger than the threshold value, it is determined that the object is not the target object. Such a relation is preliminarily decided. For example, in the case of the luminance value, if it is less than the threshold value, it is determined that the object is the target object, and in the case of the saturation, if it is equal to or larger than the threshold value, it is determined that the object is the target object.

In S27, a comparison result of S26 is saved. Since the result of S26 indicates only two kinds of cases such as case where the object is the target object and case where the object is not the target object, the result is encoded and saved in such a manner that 0 indicates the case where the object is the target object and 1 indicates the case where the object is not the target object, or the like.

In S28, whether or not all of the pixels have been processed in S27 is discriminated. If all of the pixels have been processed, the processing routine is finished.

In the embodiment 1, processes are executed in order of a flowchart illustrated in FIG. 11. But, there is a case where the result of S25 is necessary in the decision of the threshold value in S21 and there is a case where the value converted into the scalar value (S24) with respect to the adjacent pixel is necessary in the calculation in S25. Therefore, the processing order in the flowchart illustrated in FIG. 11 may be exchanged as necessary.

Although the flowchart illustrated in FIG. 11 is executed only once in the embodiment 1, it can be executed a plurality of number of times or an internal processing method may be changed at this time, according to circumstances. For example, in the first process, the color space is not converted but the luminance is obtained and processed by a quadratic differentiation. In the second process, the color space is converted and the saturation is obtained and processed while skipping S25. After that, the AND or OR of the two results is obtained and they are synthesized. Since whether the AND is used or the OR is used depends on the encoding of S27, which one of them is used is properly decided.

FIG. 7B is a diagram illustrating the extraction result 901 in the case where one print original has been put on the sheet table and the extraction result 902 in the case where the four photograph originals have been put in the embodiment 1.

Portions painted fully in black are portions extracted as target objects.

Figure 12:
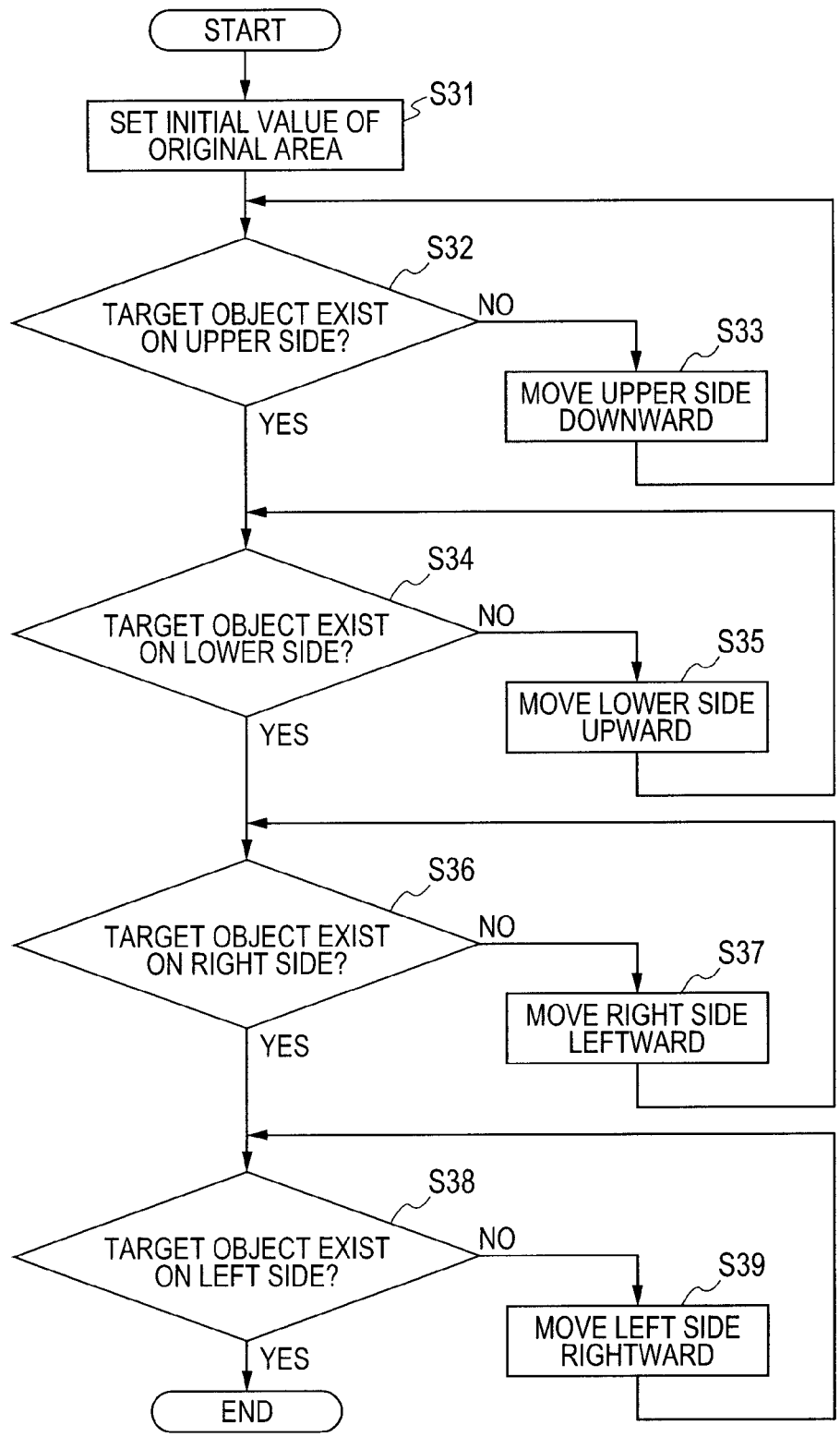
FIG. 12 is a flowchart for a process for deciding an original area in the embodiment 1.

FIG. 12 is a flowchart illustrating the process for deciding the original area in the embodiment 1. It corresponds to the process of S403 in the flowchart in FIG. 5.

In S31, an initial value of the original area is set. An area of the whole sheet table is set as an initial value of the original area. In S32, whether or not the target object extracted in S402 exists on the upper side of the original area is discriminated. If the target object does not exist on the upper side, S33 follows. If the target object exists on the upper side, S34 follows.

In S33, the upper side of the original area is moved downward. If the precision of the original area is set to one pixel, the upper side is moved by a distance of one pixel. After that, S32 follows. The upper side of the original area can be obtained by the processes of S32 and S33.

In S34, whether or not the target object extracted in S402 exists on the lower side of the original area is discriminated. If the target object does not exist on the lower side, the lower side of the original area is moved upward in S35. If the target object exists on the lower side of the original area, S36 follows.

In the case of moving the lower side of the original upward in S35, if the precision of the original area is set to one pixel, the lower side is moved by a distance of one pixel. After that, the processing routine is returned to S34. The lower side of the original area can be obtained by the processes of S34 and S35.

In S36, whether or not the target object extracted in S402 exists on the right side of the original area is discriminated. If the target object does not exist on the right side, the right side is moved leftward in S37 and the processing routine is returned to S36. If the target object exists on the right side, S38 follows.

In the case of moving the right side of the original leftward in S37, if the precision of the original area is set to one pixel, the right side is moved by a distance of one pixel. After that, the processing routine is returned to S36. The right side of the original area can be obtained by the processes of S36 and S37.

In S38, whether or not the target object extracted in S402 exists on the left side of the original area is discriminated. If the target object does not exist on the left side, the left side is moved rightward in S39. If the target object exists on the left side, the processing routine is finished.

In the case of moving the left side of the original rightward in S39, if the precision of the original area is set to one pixel, the left side is moved by a distance of one pixel. The left side of the original area can be obtained by the processes of S38 and S39.

FIG. 7C is a diagram illustrating the single original area 1001 obtained from the image which was read when one print original has been put on the sheet table and the single original area 1002 obtained from the image which was read when the four photograph originals have been put on the sheet table.

In FIG. 7C, an area shown by a broken line is the original area. The area obtained here is called a single original area.

In the extraction result 901 illustrated in FIG. 7B, the whole area of the single original area is not extracted. However, when seeing the single original area 1001 illustrated in FIG. 7C, the proper area is obtained. This is because since a part of the upper side, lower side, right side, and left side of the original could be extracted in the extraction result 901 illustrated in FIG. 7B, the process has properly been executed by the flowchart illustrated in FIG. 12.

Embodiment 2

Processes in an embodiment 2 of the invention are substantially the same as those up to step S507 in FIG. 5 in the embodiment 1. In the embodiment 2, the processing routine advances to "B2" in FIG. 6B after "B" in FIG. 5.

In S701, if the number of plural original areas obtained in S405 in FIG. 5 and the number of elements in the list coincide if the removal of the elements in S407 and S505 in FIG. 5 is not performed. This is because each angle difference of the plural areas does not occur and such a state corresponds to the case where the user did not manually put a plurality of originals onto the sheet table. Therefore, the single original area obtained in S403 in FIG. 5 is set to the original area of the image which was read in S401.

If at least one of the elements was removed in S505 in FIG. 5, the number of plural original areas is larger than the number of elements in the list. This means that at least one angle difference of the plural areas occurred and since there is a possibility that the user manually put a plurality of originals onto the sheet table, the processing routine advances to S702.

In S702, the maximum value of the long side and the minimum value of the long side are obtained from the list. The maximum value of the long side/the minimum value of the long side is obtained as a long side rate.

In S703, the maximum value of the short side and the minimum value of the short side are obtained from the list. The maximum value of the short side/the minimum value of the short side is obtained as a short side rate.

In S704, whether or not the long side rate and the short side rate obtained in S702 and S703 are equal to or larger than 1.2 is discriminated. If the user put the photographs of the same size such as L-size photographs, 4×6 photographs, or the like, both of the long side rate and the short side rate are close to 1.0. This is because since the sizes of originals are equal, the maximum value of the long side and the minimum value of the long side are similar values. Although they are accurately equal to 1.0, they are set to 1.2 so as to have a margin in consideration of an error of the area decision in S405 in FIG. 5 and an error of the original itself. By inserting such a discriminating process, when the user has put the photographs of the same size, a fact that the original area is the plural original areas can be certainly discriminated.

Since the presence or absence of the angle difference can be discriminated in S701 even in the case of the 4-in-1 printing or the index printing, whether the user has manually put the original onto the sheet table or the printing is an automatic layout printing can be discriminated. That is, if the angle difference occurred and the long side rate and the short side rate of the original are equal, it is determined that the plural original areas obtained in S405 in FIG. 5 are the original area of the image read in S401.

Although not shown particularly, the image process can be executed after that based on the decided original area. If the resolution of the image read in S401 is a temporary resolution, the decided original area can be also read at a desired resolution. If a skew occurred in the obtained original area, the image can be also rotated so as to correct the skew.

Embodiment 3

Figure 13:
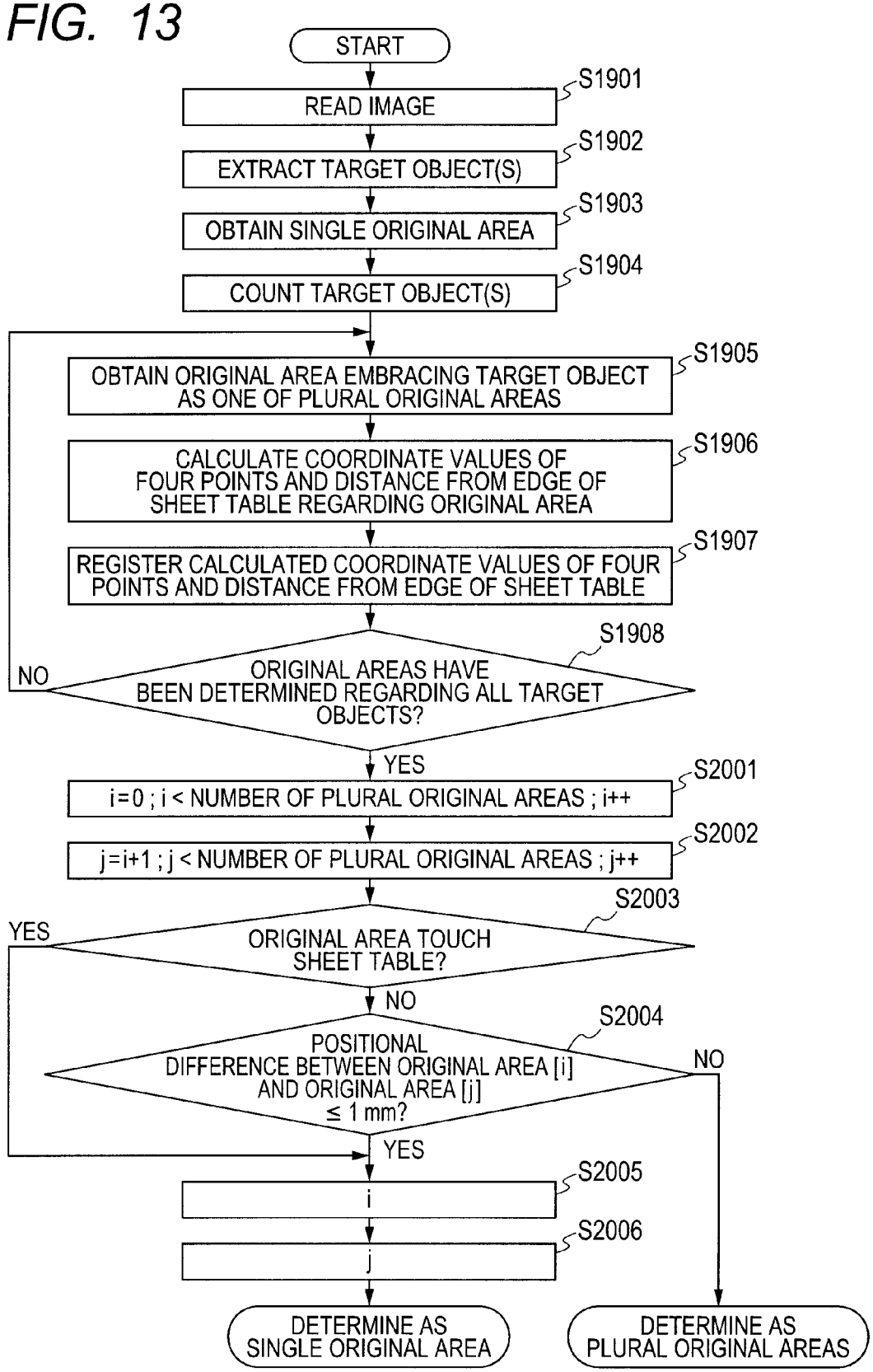
FIG. 13 is a flowchart illustrating the reading operation of the scanner 10 in an embodiment 3.

FIG. 13 is a flowchart illustrating the reading operation of the scanner 10 by the host PC 50 in an embodiment 3 of the invention.

The embodiment 3 is an embodiment in which if aspect ratios of the positions of the extracted rectangles are aligned, it is determined that the original area is the plural areas of one print original (presentation reference such as Power Point).

In FIG. 13, processes of S1901 to S1905 are similar to the processes of S401 to S405 in FIG. 5 described in the embodiment 1. In S1906, coordinate values of four points of the obtained plural original areas are obtained. Further, distances from the edges of the sheet table are also obtained in a manner similar to FIG. 9 in the embodiment 1. A result obtained in S1907 is registered into the list.

Figure 15A:
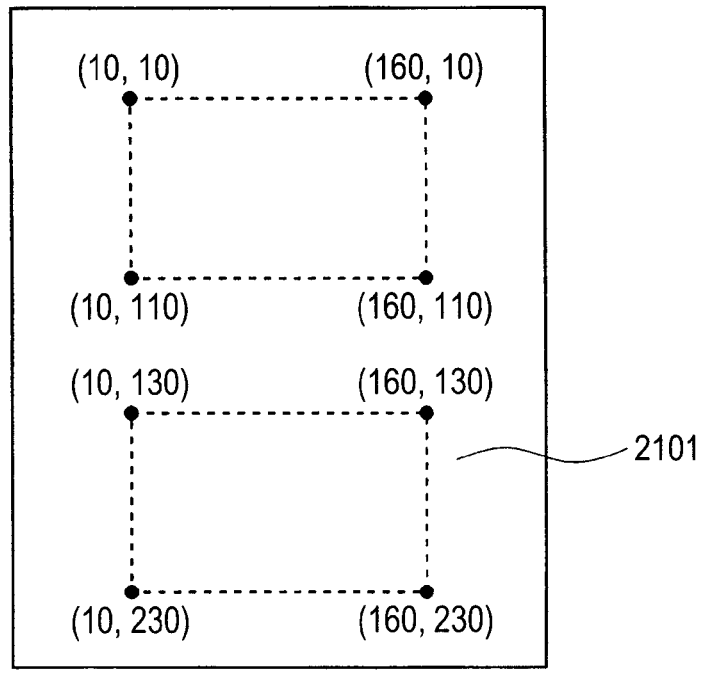
FIGS. 15A and 15B are diagrams illustrating an extraction result of one print original and an extraction result of two photograph originals.
Figures 16A, 16B, 17:
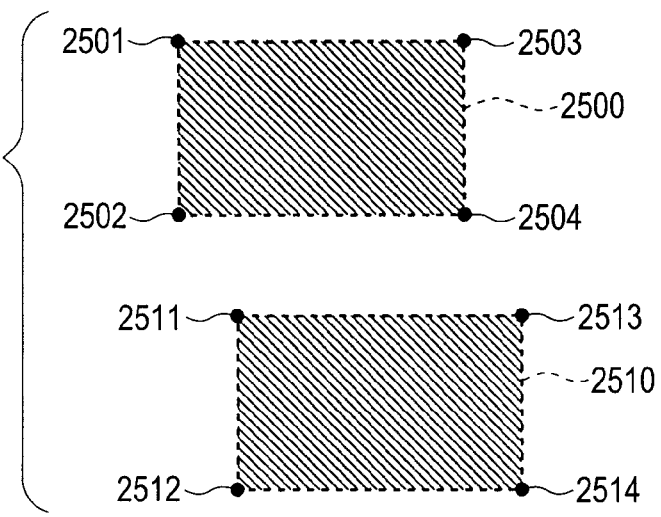
FIGS. 16A and 16B are diagrams illustrating lists of calculation values obtained from a plurality of areas of the print original.
FIG. 17 is a diagram illustrating two original areas.

FIG. 16A is a diagram illustrating a list obtained after all calculation results obtained from plural areas 2101 of one print original illustrated in FIG. 15A have been registered.

Since there are two areas, the index number is equal to 1 to 2 and the coordinate values of the four points and the distances from the edges of the sheet table have been recorded, respectively. Each element in the list can be referred to by the index number.

Figure 15B:
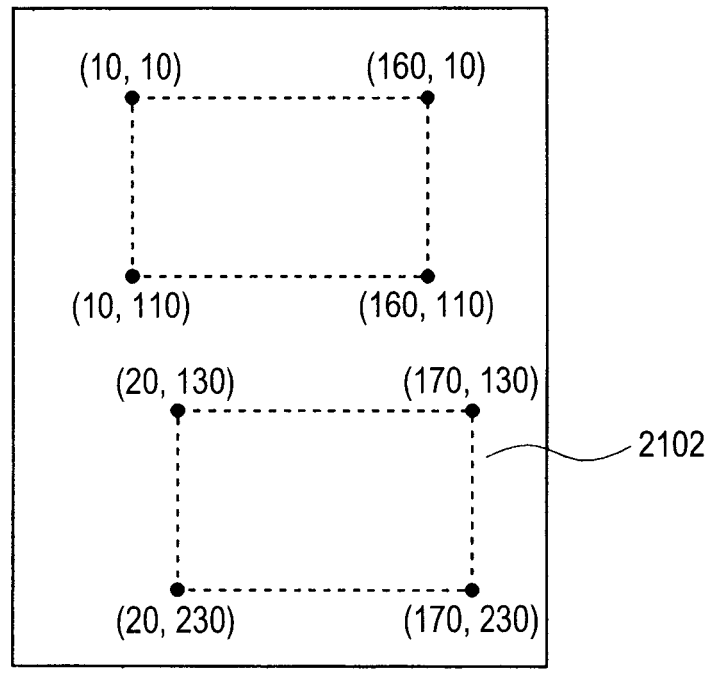

FIG. 16B is a diagram illustrating a list obtained after all calculation results obtained from plural areas 2102 of two photograph originals illustrated in FIG. 15B have been registered.

A loop process of S1905 to S1907 is repeated until all of the target objects are processed in S1908. If YES in the discriminating step S1908, all of the target objects have been processed.

In S2001, a loop process is repeated the number of times as many as the number of plural original areas from the beginning to the end of the plural original areas obtained in S1905. A termination of the loop is S2005.

In S2002, a loop process is repeated from (the count value of the loop count in S2001)+1 to the end of the plural original areas obtained in S1905. A termination of the loop is step S2006.

A loop process of S2001 and S2002 is also executed in a manner similar to S501 and all combinations can be operated.

In S2003, whether or not the original area touches the sheet table is discriminated. With reference to the distances from the edges of the sheet table in the lists (FIGS. 16A and 16B) based on the values of i and j, whether or not the distance value is equal to or less than 5.0 mm is discriminated. If the original area touches the edge of the sheet table, the distances from the edges of the sheet table is equal to 0.0 mm. However, it is set to 5.0 mm in consideration of the calculation error and the like. However, a case where the distance is smaller or larger than 5.0 mm is also considered due to the precision of the device or the like.

If it is now determined that the original area touches the sheet table, the processing routine advances to S2005. In other cases, the processing routine advances to S2004.

In S2004, a positional difference between the two original areas is obtained. A method of obtaining the positional difference will be described in detail hereinafter. If the positional difference is equal to or less than 1 mm, the single original area read in S1903 is set to the original area of the image read in S1901. If the positional difference is larger than 1 mm, the plural original areas obtained in S1905 are set to the original area of the image read in S1901 in FIG. 13.

When the user has manually put the photograph original or the like onto the sheet table, even if he accurately put it, a small positional difference occurs. In the case of an original such as a presentation reference or presentation material, since a plurality of original images have accurately been arranged, no positional difference occurs. The positional difference depends on the precision at the time of obtaining the coordinate values in S1905. In the case of the original on which photographs or the like have been printed, the positional difference is almost equal to 0. Although the positional difference has been set to 1 mm in consideration of a margin such as an error, a case where the positional difference is smaller or larger than 1 mm is also considered due to the precision of S1905.

S2006 is a termination of the loop process of S2002. S2005 is a termination of the loop process of S2001.

Figure 14:
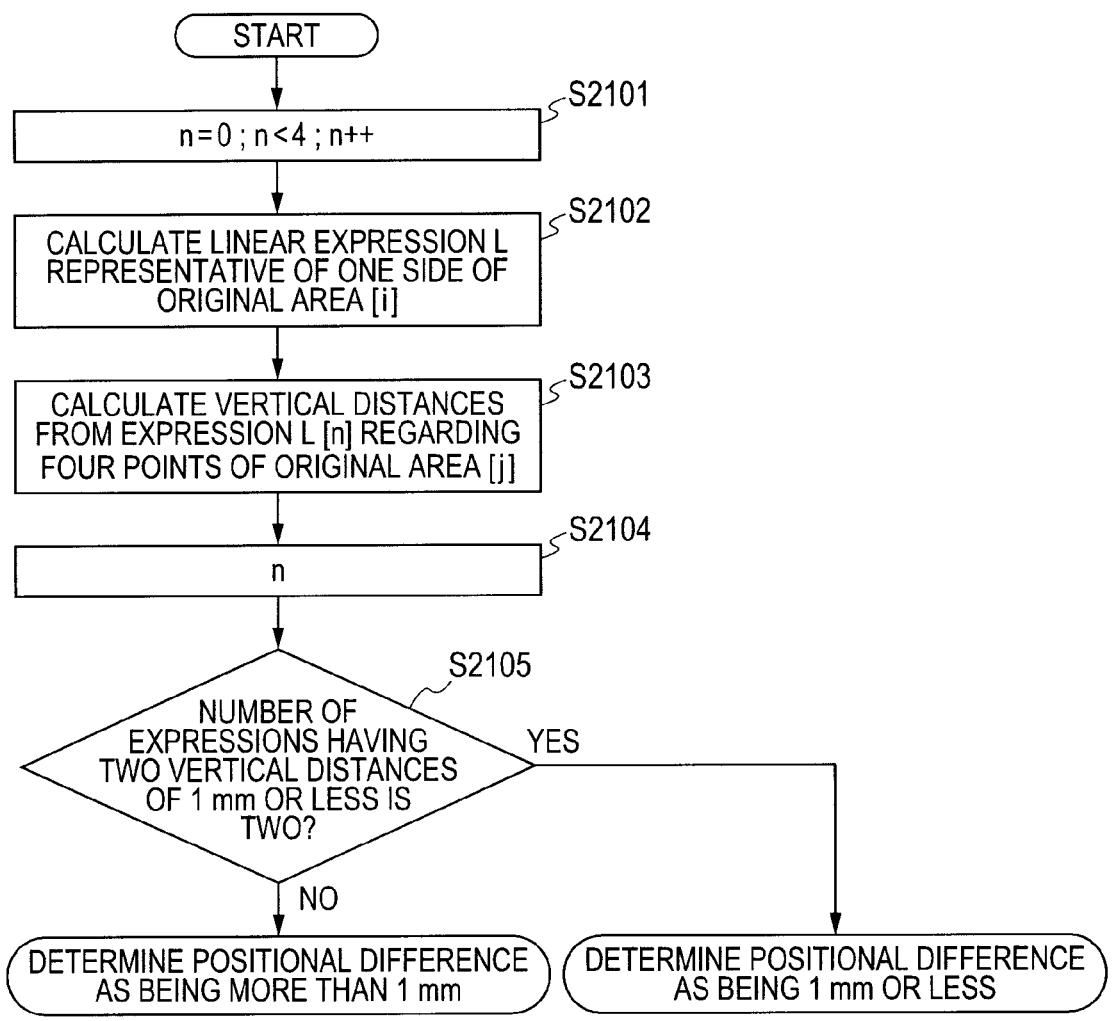
FIG. 14 is a flowchart for obtaining a positional difference between two original areas.

FIG. 14 is a flowchart for obtaining the positional difference between the two original areas in S2004 in FIG. 13. In S2101, a loop process is repeated four times in order to obtain distances from all vertices of an original area [j] for all of four sides of an original area [i]. A termination of the loop process is S2104.

In S2102, a linear expression L of one side of the original area is obtained with reference to the coordinate values of the original area of the value of i in the lists (FIGS. 16A and 16B). For example, the linear expression L is obtained from the coordinate values of vertices 2501 and 2502 of an original area 2500 in FIG. 17 and from an expression shown in FIG. 18A. When referring to the list (FIG. 16B), the vertex 2501 is set to (10, 10) and corresponds to (x1, y1). In the case where the vertex 2502 is set to (10, 110) and corresponds to (x2, y2), the linear expression L: x=10 is obtained from the expression of FIG. 18A.

In S2103, with reference to the linear expression L of the original area [i] obtained in S2101 and the coordinate values of the original area of the value of j in the lists (FIGS. 16A and 16B), vertical distances from four points of the original area [j] are obtained.

For example, vertical distances from four points of vertices 2511, 2512, 2513, and 2514 of an original area 2510 are obtained by an expression shown in FIG. 18B from the linear expression L obtained from the vertices 2501 and 2502 in FIG. 17. Now, assuming that the linear expression obtained in S2102 is L: x=10 with reference to the list (FIG. 16B) and the vertices 2511, 2512, 2513, and 2514 are set to (20, 130), (20, 230), (170, 130), and (170, 230), respectively, the following distances are obtained as follows. That is, from the expression of FIG. 18B, a distance between the straight line L and the vertex 2511 is equal to 10 mm, a distance between the straight line L and the vertex 2512 is equal to 10 mm, a distance between the straight line L and the vertex 2513 is equal to 160 mm, and a distance between the straight line L and the vertex 2514 is equal to 160 mm, respectively.

S2104 is a termination step of the loop process starting from S2101. In S2105, whether or not there are two points where each of the vertical distances obtained in S2103 is equal to or less than 1 mm is discriminated, thereby discriminating whether or not the number of linear expressions which can satisfy the conditions mentioned above is equal to 2. If they exist, it is determined that the positional difference between the original area [i] and the original area [j] is equal to or less than 1 mm. If they do not exist, it is determined that the positional difference is larger than 1 mm.

If the user manually put the original onto the sheet table here, a deviation occurs. However, in the case of the presentation reference or the like, the plural original areas are accurately arranged and the sides of the original areas exist on one straight line. Since the number of points where the vertical distances are equal to or less than 1 mm is equal to 2, the precision in the case of discriminating that the original is the presentation reference or the like is improved.

In the case of the presentation reference or the like, since sizes and orientations of the print areas are equal, respectively, there are two linear expressions which can satisfy the foregoing conditions. Therefore, original areas illustrated in FIGS. 19A and 19B can be excluded and an erroneous discrimination can be prevented.

That is, the electric board 40 is an example of an original area detecting unit for detecting an original area in the case where there is one original and is an example of a plural original area detecting unit for detecting original areas in the case where there are a plurality of originals. The electric board 40 is also an example of a unit for discriminating that the tilt angles of the rectangular areas obtained by the plural original area detecting unit are equal. As a result of the above discrimination, if it is determined that one or more tilt angles of the rectangular areas are not equal, it is decided that the areas obtained by the plural original area detecting unit are the original areas.

Further, the electric board 40 is an example of an adjacent detecting unit for detecting whether or not a result of the detection of the plural original area detecting unit indicates that the original area is adjacent to the edge of the sheet table. If the adjacent detecting unit detects that the original area is adjacent to the edge of the sheet table, such an original area is excluded from the target objects of the process for discriminating whether or not the tilt angles of the rectangular areas are equal.

In addition, the electric board 40 is an example of a unit for discriminating whether or not the tilt angles of the rectangular areas obtained by the plural original area detecting unit are equal and is also example of a discriminating unit for discriminating whether or not the dimensions of the rectangular areas obtained by the plural original area detecting unit are equal.

As results of the above discriminations, if one or more tilt angles of the rectangular areas are not equal and the dimensions of the rectangular areas are equal, it is decided that the areas obtained by the plural original area detecting unit are the original areas. In this case, the discriminating unit for discriminating whether or not the dimensions of the rectangular areas are equal discriminates as follows.

That is, the long side rate between the maximum long side and the minimum long side of each rectangular area obtained by the plural original area detecting unit is compared with the short side rate between the maximum short side and the minimum short side of each rectangular area obtained by the plural original area detecting unit. If both of the long side rate and the short side rate are close to 1, it is determined that the dimensions of the rectangular areas are equal.

The electric board 40 is an example of a unit for detecting whether or not the original areas detected by the plural original area detecting unit are adjacent to the edge of the sheet table. In this case, if the unit for detecting whether or not the original areas detected by the plural original area detecting unit are adjacent to the edge of the sheet table detects that they are adjacent to the edge of the sheet table, such original areas are excluded from the target objects of the process for discriminating whether or not the tilt angles of the rectangular areas are equal.

The electric board 40 is also an example of a discriminating unit for discriminating whether or not the positions of the rectangular areas obtained by the plural original area detecting unit are aligned. If it is determined by the discriminating unit that the positions of the rectangular areas are not aligned, it is decided that the areas obtained by the plural original area detecting unit are the original areas.

The electric board 40 is also an example of an adjacent detecting unit for detecting whether or not the original areas detected by the plural original area detecting unit are adjacent to the edge of the sheet table. If the adjacent detecting unit detects that the original areas detected by the plural original area detecting unit are adjacent to the edge of the sheet table, such original areas are excluded from the target objects of the discrimination which is made by the discriminating unit.

If each unit in the above embodiment is replaced by a processing step, the embodiment can be grasped as an image processing method.

Embodiment 4

The embodiment 4 of the invention is an embodiment which is applied to a system constructed by a plurality of apparatuses (for example, a host computer, an interface apparatus, a scanner, a printer, a multifunction peripheral, and the like).

Program codes may be supplied from a storage medium (or a recording medium) in which the program codes of software for realizing the functions of the embodiments mentioned above have been stored to a system or an apparatus. A computer (or CPU or MPU) of the system or apparatus may read out and execute the program codes stored in the storage medium.

In this case, the program codes themselves read out of the storage medium realize the functions of the embodiments mentioned above and the storage medium in which the program codes have been stored constructs the invention.

As a storage medium for storing the program codes, for example, there is a flexible disk, a hard disk, a ROM, a RAM, a magnetic tape, a non-volatile memory card, a CD-ROM, a CD-R, a DVD, an optical disk, a magnetooptic disk, an MO, or the like.

That is, the above embodiment relates to an example of a computer-readable storage medium in which a program for allowing a computer to function as each unit constructing an image processing apparatus according to any one of claims 1, 3, and 6 has been stored.

According to the embodiments, since even the beginner user or the superior user can always provide the original area of the same precision, the deterioration in precision of the original area that is caused due to the user can be prevented.

According to the embodiments, since the operation "the user selects the proper process" is unnecessary, when the user puts the original and presses "Read button", the image of the optimum reading area can be easily obtained according to the original.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-142162, filed Jun. 15, 2009, if which is hereby incorporated by reference herein in its entirety.

What is claimed is:

1. An apparatus, comprising:
an acquiring unit configured to acquire a read image obtained by reading of one or more originals by an image reading apparatus;
an extracting unit configured to extract one or more candidate areas corresponding to one or more originals in the read image acquired by the acquiring unit, by analyzing the read image;
and
a deciding unit configured to, in a case where a first candidate area and a second candidate area are extracted by the extracting unit, decide whether each of the first and second candidate areas corresponds individually to one of the originals, based on at least one of a difference tilts in the read image between the first and second candidate areas, a difference of sizes in the read image between the first and second candidate in the read image, and a difference of coordinates in the read image between the first and second candidate areas.

2. An apparatus according to claim 1, wherein the deciding unit further decides whether both of the first and second candidate areas correspond to one original, based on the difference.

3. An apparatus according to claim 1, wherein in a case where the difference of the tilts occurs, the deciding unit decides that each of the first and second candidate area corresponds individually to one original.

4. An apparatus according to claim 1, wherein in a case where the difference of the sizes is not larger than a predetermined difference of sizes, the deciding unit decides that each of the first and second candidate areas corresponds individual to one original.

5. An processing apparatus according to claim 1, wherein in a case where the difference of the coordinates is larger than a predetermined difference of coordinates, the deciding unit decides that each of the first and second candidate areas corresponding individual to one original.

6. An apparatus according to claim 1, further comprising
a determining unit configured to determine whether an original corresponding to one of the candidate areas extracted by the extracting unit are adjacent to edges of an original table of the image reading apparatus, based on the read image, and
wherein the deciding unit does not decide that each of the first and second candidate areas corresponds individually to one original in a case where the determining unit determines that an original corresponding to at last one of the first and second candidate areas is adjacent to the edge of the original table.

7. An apparatus according to claim 1, wherein the candidates extracted by the extracting unit are rectangular, and the deciding unit deciding whether each of the first and second candidate areas corresponds individually to one original based on the difference of aspect ratios between the first and second candidate areas.

8. An apparatus according to claim 1, wherein the deciding unit calculates the difference of tilts between the first and second candidate areas in the read image, and decides whether each of the first and second candidate areas corresponds individually to one of the originals, based on the calculated difference of tilts.

9. An apparatus according to claim 1, wherein the deciding unit decides whether each of the first and second candidate areas corresponds individually to one of the originals, based on a difference of one-dimensional coordinates between the first and second candidate areas.

10. A method, comprising:
acquiring a read image obtained by reading of one or more originals by an image reading apparatus;
extracting one or more candidate areas corresponding to the one or more originals in the read image by analyzing the read image;
and
deciding, in a case where a first candidate area and a second candidate area are extracted, whether each of the first and second candidate areas corresponds individually to one of the originals based on at least one of a difference of of tilts in the read image between the first and second candidate areas, a difference of sizes in the read image between the first and second candidate areas, and a difference of coordinates in the read image between the first and second candidate areas.

11. A method according to claim 10, further comprising, in a case where the extracted candidates are rectangular, deciding whether each of the first and second candidate areas corresponds individually to one original based on the difference of aspect ratios between the first and second candidate areas.

12. A computer-readable storage medium in which a program for allowing a computer to execute an image processing method, the method comprising:
acquiring a read image obtained by reading of one or more originals by an image reading apparatus;
extracting one or more candidate areas corresponding to the one or more originals in the read image by analyzing the read image; and
deciding, in a case where a first candidate area and a second candidate area are extracted, whether each of the first and second candidate areas corresponds individually to one of the originals based on at least one of a difference of tilts in the read image between the first and second candidate areas, a difference of sizes in the read image between the first and second candidate areas, and a difference of coordinates in the read image between the first and second candidate areas.

13. A computer-readable storage medium to claim 12, wherein the method further comprises deciding whether both of the first and second candidate areas correspond to one original, based on the difference.

14. A computer-readable storage medium according to claim 12, wherein in a case where the difference of the tilts occurs, the method further comprises deciding that each of the first and second candidate area corresponds individually to one original.

15. An computer-readable storage medium according to claim 12, wherein in a case where the difference of the sizes is not larger than a predetermined difference of sizes, the method further comprises deciding that each of the first and second candidate areas corresponds individual to one original.

16. An processing apparatus according to claim 12, wherein in a case where the difference of the coordinates is larger than a predetermined difference of coordinates, the method further comprises deciding that each of the first and second candidate areas corresponding individual to one original.

17. An computer-readable storage medium according to claim 12, wherein the method further comprises:

determining whether an original corresponding to one of the candidate areas are adjacent to edges of an original table based on the read image, and deciding that each of the first and second candidate areas does not correspond individually to one original in a case where it is determined that an original corresponding to at last one of the first and second candidate areas is adjacent to the edge of the original table.

18. A computer-readable storage medium according to claim 12, wherein the extracted candidates are rectangular, and the method further comprises deciding whether each of the first and second candidate areas corresponds individually to one original based on the difference of aspect ratios between the first and second candidate areas.

19. A computer-readable storage medium according to claim 12, wherein the method further comprises deciding the difference of tilts between the first and second candidate areas in the read image, and decides whether each of the first and second candidate areas corresponds individually to one of the originals, based on the calculated difference of tilts.

20. A computer-readable storage medium according to claim 12, wherein the method further comprises deciding whether each of the first and second candidate areas corresponds individually to one of the originals based on a difference of one-dimensional coordinates between the first and second candidate areas.

* * * * *